G. W. COLLIN.
PRESSURE REGULATOR.
APPLICATION FILED JULY 18, 1903.
942,546.
Patented Dec. 7, 1909.
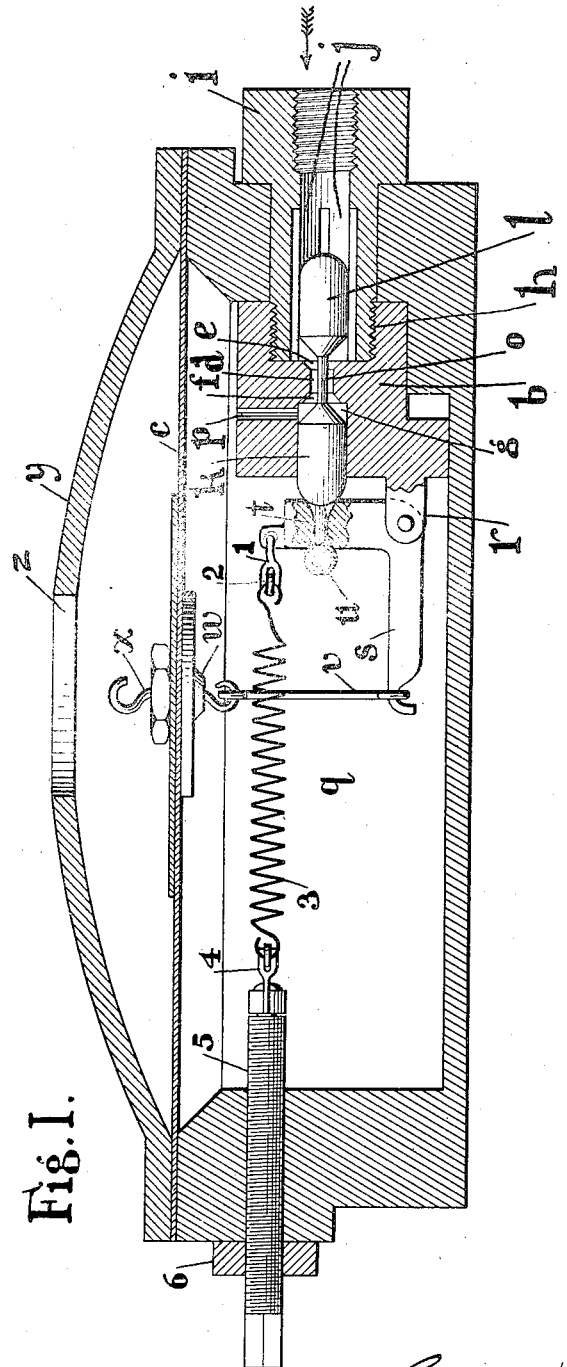
Fig. I.
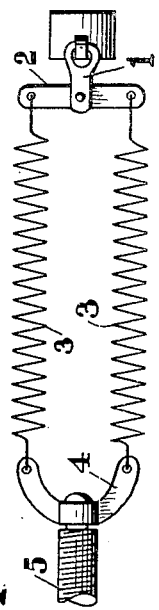
Fig. II.
WITNESSES:
INVENTOR
George W. Collin
BY
ATTORNEY

UNITED STATES PATENT OFFICE.

GEORGE WOLVERTON COLLIN, OF BRIDGEPORT, CONNECTICUT, ASSIGNOR TO THE SAFETY CAR HEATING AND LIGHTING COMPANY, A CORPORATION OF NEW JERSEY.

PRESSURE-REGULATOR.

942,546.

Specification of Letters Patent.

Patented Dec. 7, 1909.

Application filed July 18, 1903. Serial No. 166,175.

*To all whom it may concern:*

Be it known that I, GEORGE WOLVERTON COLLIN, a citizen of the United States, residing at Bridgeport, county of Fairfield, and State of Connecticut, have invented certain new and useful Improvements in Pressure-Regulators, of which the following is a specification.

My invention relates to gas systems and has for one of its objects the provision of means for regulating the flow of gas under pressure from the storage receptacle or tank to the consuming devices.

Another object is the provision of a pressure regulator such that the flow of gas will be shut off automatically upon the occurrence of certain abnormal conditions.

Another object is to provide an automatic pressure regulator characterized by increased simplicity and efficiency.

Other objects will be in part obvious and in part pointed out hereinafter.

The invention accordingly consists in the features of construction, combinations of elements and arrangement of parts which will be exemplified in the apparatus hereinafter described, and the scope of the application of which will be indicated in the following claims.

Referring now to the drawings, wherein is illustrated one of the various possible embodiments of my invention, Figure 1 is a transverse sectional view of the same. Fig. 2 is a plan view of the spring tension device.

Similar reference characters refer to similar parts throughout the several views of the drawings.

Preliminary to a description of the specific features of my invention and as conducive to a clearer understanding of certain objects thereof, it may here be noted that, in gas systems, it is essential that means be provided for regulating the flow of the gas from the containing reservoir or tank to the consuming devices in order to insure a substantially even pressure in the system. I have, therefore, found it desirable to provide a regulator capable of regulating the pressure automatically and, my invention being particularly adapted for use in railway cars or similar structures, I have provided means such that accurate results may be obtained, notwithstanding the jarring incident to the motion of the car. The above and other advantages are secured in constructions of the nature of that hereinafter described.

Referring now to the drawings, *a* indicates the casing of the pressure regulator formed in two parts, as shown, and within which is located the valve support or bracket *b*. Suitably secured between the sections of casing *a* and forming a partition therebetween is a diaphragm, or other controlling device, *c* of suitable material adapted to be influenced by pressure and which is connected with the means for regulating the supply of gas. The valve support or bracket is provided with a gas-way *d* having valve seats *e* and *f* at opposite ends thereof. The valve support or bracket is recessed at one side, as at *g*, to form a valve chamber, and at the opposite side is provided with an integral screw-threaded member *h*, into which a gas-conducting bushing *i* is threadedly secured. Bushing *i* is preferably provided with longitudinally extending grooves *j*, which provides passage-ways for the gas.

Located within valve chamber *g* and bushing *i* are valves *k* and *l* respectively, suitably connected to move in unison by means of rod *o* passing through gas-way *d* which connects the valve seats *e* and *f*. Leading from valve chamber *g* and communicating with the regulating chamber *q* is a gas-way *p*.

Pivotally mounted upon the lug or projection *r* extending from valve support *b* is a bell-crank lever *s* provided with an aperture tapering outwardly in either direction from its interior portion and through which a valve operating stem *t* extends from valve *k*, which, at its outer end, as herein shown, terminates in a ball or enlargement so as to permit the rocking of the bell-crank lever *s* about valve stem *t*. One end of bell-crank lever *s* is connected by a link *v* and a hook or fastening *w* to diaphragm *c*, and at its opposite end is connected by means of a shackle 1 to a cross bar 2, to each end of which retractile springs 3 are connected, the opposite ends of which are connected to the bridle bar 4 swiveled upon an adjusting screw 5 threaded into the wall of casing *a* and preferably provided with a lock nut 6 to hold the same in the adjusted position. Screw 5 operates to regulate the tension of springs 3.

If desired, a hook or other device *x* may be provided upon the upper surface of diaphragm c, to which access may be had through an opening z in cover section y and casing a, should it be desired to raise the diaphragm for any purpose.

Having thus described my invention, its operation, which should be largely obvious from the above description, is substantially as follows: With the several coöperative parts in their normal positions, the pressure of gas on the regulator diaphragm will be such as to maintain valves k and l away from their respective seats to allow a normal flow of gas to take place. Upon an increase of pressure, however, diaphragm c will be flexed upwardly and, through the connecting means, will draw valve l closer to its seat to cut down the flow of gas, and, accordingly, the pressure in the regulating chamber, it, of course, being understood that gas enters bushing i flowing in the direction of the arrow, as shown in Fig. 1. A diminution of pressure will cause an opposite flexure of diaphragm c and a movement of the valves in an opposite direction. In case of a breakage in the consuming devices or pressure of the regulator, or upon the occurrence of any other abnormal condition, the upward or downward movement of the diaphragm under the increased or diminished pressure will operate to seat valve l or k in its respective seat, entirely shutting off the flow of gas. At this point, it may be noted that, in the event of the breakage of the diaphragm or of a pipe on the low pressure side of the valve, the tension of the diaphragm upon the bell-crank lever s will be relieved. This tendency is provided for, however, by the provision of springs 3, which, through their connection with bell-crank lever s, will seat valve l in its seat, shutting off thereby the flow of gas to the consuming devices. Adjusting screw f operates to determine through bell-crank lever s and link v the relative amount of flexure in either direction of diaphragm c under varying pressures. It will, accordingly, be seen that I have provided a pressure regulator of novel construction well adapted to achieve the objects of my invention and which, moreover, is characterized by accuracy of operation, the spring-controlling means being uninfluenced by jarring of the car, insuring a stable operative apparatus.

While I have described and shown my invention in the above relation, it is, of course, obvious that I am not limited to such employment, as many of its features are capable of use in a variety of other relations in other structures.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

Having described my invention what I claim and desire to secure by Letters Patent is:

1. In a regulator, in combination, a pressure chamber having a gas inlet opening, a flexible diaphragm forming one of the walls of said pressure chamber, a valve located within said gas inlet opening and adapted to cut off the flow of gas therethrough, a bell crank lever pivotally mounted at a point intermediate its ends within said pressure chamber, one of the legs of said lever intermediate its ends being connected with said valve, a link connecting the other leg of said bell crank lever with said diaphragm, a pair of coil springs connected with the end of said first mentioned leg of the bell crank lever, and an adjusting screw accessible from a position exteriorly of said chamber having a swivel connection with said springs.

2. In a regulator, in combination, a pressure chamber having a gas inlet opening, a flexible diaphragm formed in one of the walls of said pressure chamber, means having two oppositely disposed valve faces located within said gas inlet opening and adapted to cut off the flow of gas therethrough by movement in either direction, a bell crank lever pivotally mounted within said pressure chamber, one leg of said lever intermediate its ends being connected with said means, a link connecting the other leg of said bell crank lever with said diaphragm, a pair of coil springs connected with the end of the first mentioned leg and positioned upon either side of said link and an adjusting screw operative from a position exteriorly of said chamber connected with said springs.

3. In a regulator, in combination, a pressure chamber, a valve chest comprising piston chambers connected by a reduced passage, the ends of said passage forming valve seats, a valve piston having oppositely disposed faces adapted to engage said seats, an axially alined inlet to one of said chambers, a laterally extending outlet from the other of said chambers and means in said pressure chamber adapted to control the operation of said valve.

GEORGE WOLVERTON COLLIN.

Witnesses:
ELMER E. ALLBEE,
GEO. E. MORSE.